Jan. 8, 1935.                L. N. LEHMAN                1,987,015
              OVERDRAFT CONTROL OF RIBBON MECHANISM
                 Filed Sept. 12, 1932        3 Sheets-Sheet 1

Inventor
Laurence N. Lehman
By

His Attorney

Jan. 8, 1935.  L. N. LEHMAN  1,987,015

OVERDRAFT CONTROL OF RIBBON MECHANISM

Filed Sept. 12, 1932  3 Sheets-Sheet 3

Inventor
Laurence N. Lehman
By

His Attorney

Patented Jan. 8, 1935

1,987,015

UNITED STATES PATENT OFFICE 1,987,015

OVERDRAFT CONTROL OF RIBBON MECHANISM

Laurence N. Lehman, Dayton, Ohio, assignor to The National Cash Register Company, Dayton, Ohio, a corporation of Maryland Application September 12, 1932, Serial No. 632,663

12 Claims. (Cl. 235—60)

This invention relates to adding typewriters of the Ellis type which are illustrated and described in Letters Patent of the United States 1,197,276 and 1,197,278, issued September 5, 1916 to Halcolm Ellis, Patent 1,203,863, also issued to Halcolm Ellis on November 7, 1916, and Patent 1,819,084 issued to Emil John Ens on August 18, 1931.

The present invention is incorporated in a machine of the well known Ellis type, preferably one having a traveling carriage, and if desired they can be equipped with a typewriter attachment. Such a machine usually has two to four totalizers, one of which is of the add-subtract type as shown in the above mentioned Ellis Patent 1,203,863 and is arranged to accumulate positive or negative amounts at the will of the operator.

A machine of this type is well adapted for use in banking establishments where deposits and withdrawals are constantly being made upon individual checking accounts and furnishes a means whereby these different accounts may be accurately and rapidly balanced.

The general procedure in using a machine of this type in the banking business is as follows:

A record sheet for the depositor whose account is to be balanced, is inserted in the machine in such a manner that the proper line is in position to be printed upon. The old balance appearing upon the record sheet is then entered into the add-subtract totalizer, next the checks issued by the depositor are subtracted from the old balance and simultaneously listed individually, and if desired, may be added into one of the remaining totalizers of the machine, the reading of which gives the total amount of checks listed.

For example, three columns may be provided for listing the checks and the traveling carriage may be tabulated from one column to the next or the paper fed vertically at the discretion of the operator. The next step is the adding of any deposits made intermediate balancing periods, which are, as a general rule, daily. The operator then takes a total of the add-subtract totalizer to get a new balance, which is printed in the extreme right hand column on the record sheet.

The occurring of an overdraft in the add-subtract totalizer is immediately called to the attention of the operator by means of an indicator, visibly mounted below the keyboard of the machine. Also the occurrence of an overdraft automatically locks the total key for the add and subtract totalizer and unlocks an overdraft key, thus making it impossible to take a total of the add-subtract totalizer, while the totalizer is in an overdrawn condition.

In the machine of the present invention, upon ascertaining that an overdraft exists the operator may, if she sees fit, continue the balancing of the account or immediately discontinue this balancing. In either case the depression of the overdraft key causes the machine to automatically operate through three cycles to print the amount of the overdraft in positive fashion and in a distinctive color upon the record sheet.

Therefore, among the objects of the present invention are; to provide mechanism whereby the operation of a single manipulative member will cause the machine to operate through three successive cycles to obtain a positive printing of the overdraft in a distinctive color; to supply means for automatically disabling the printing mechanism during the first and second cycles of an overdraft operation and control the ribbon shifting means during the first cycle; to provide means under control of the overdraft key for effecting a shifting of the ribbon whereby an overdraft is printed in a distinguishing color or manner; and to provide means rendered effective by the printer disabling means to automatically shift the ribbon to cause an overdraft to be printed in a distinctive color.

With these incidental objects in view, the invention consists of certain novel features of construction and combination of parts, the essential elements of which are set forth in appended claims and a preferred form of embodiment of which is hereinafter described with reference to the drawings which accompany and form part of this specification. Of said drawings:

In the figure showing the frame work in phantom by dot and dash lines, where the dot and dash lines do not show behind the parts it indicates that such parts are in front of the frame, but where the dot and dash lines are shown crossing the full line parts it indicates that said parts are behind the frame.

General description

Described in general terms the machine to which this present invention is applied comprises a plurality of totalizers actuated in add operations by key set actuator rack which also positions the printing segments in accordance with the keys depressed. In total operations the actuator racks turn the totalizer to zero and position the printing segments commensurate with the amount on said totalizer, as has been clearly shown and described in the art in the previously mentioned Ellis patents.

The mechanism of the Ellis machine is operated by a constantly running electric motor of conventional design, such as shown in Letters Patent of the United States granted to N. W. Perkins, No. 1,136,165 on April 20, 1915. Such a motor is clutched to the machine operating mechanism by the manipulation of a starting bar or the overdraft key and is automatically unclutched after the mechanism completes its cycle or cycles of operation.

The starting bar of the machine to which the present invention is applied is of the type which is pivoted near its center to make it double acting. A depression of the upper end of said bar simultaneously releases the machine for operation and causes the platen roll to line space the paper wound thereon, whereas depression of the lower end of the starting bar likewise releases the machine for operation and simultaneously causes the traveling carriage to tabulate from one column to another.

The keyboard is arranged substantially the same as other adding machine keyboards and has a plurality of control keys which select the different totalizers for particular operations, and a plurality of amount keys for properly positioning the totalizer actuating racks in add, non-add and subtract operations.

An overdraft indicator is visibly mounted beneath the keyboard and shows at all times whether the add-subtract totalizer is in a positive or a negative condition.

An auxiliary differential of the type fully illustrated and described in application for Letters Patent of the United States to Charles L. Lee, Serial Number 605,160, filed April 14, 1932, has been incorporated in the present machine and is arranged to cooperate with the actuator racks during overdraft operations. The complement of the overdraft is first transferred from the add-subtract totalizer to the auxiliary differential device after which said complement is then subtracted from the cleared add-subtract totalizer which results in a positive setup of the amount of the overdraft in the add-subtract totalizer.

An overdraft key is conveniently located on the upper right hand corner of the keyboard and is arranged to exercise complete control over the machine during all overdraft operations. Depression of this key causes the machine to automatically operate through three cycles necessary in overdraft operation to transpose a negative overdraft into a positive amount and to print said positive amount. Depression of the overdraft key also causes the printing mechanism to be disabled during the first and second cycles of an overdraft operation and effectively engages the auxiliary differential with the actuator racks.

The machine is provided with a bichrome or two color ribbon so that all amounts printed from the printing type on a record sheet or card are clearly legible. Amounts of deposits and balances that are not overdrawn are printed in one color, for example, black, but overdrawn or negative balances are printed in a different color, for example, red. The printing of the overdraft in red or any other desirable distinctive color is absolutely automatically accomplished, that is, the operator need not shift the ribbon mechanism by hand when or prior to ascertaining the amount of any overdraft.

To accomplish this automatic result the machine is provided with mechanism under control of the overdraft key, whereby the ink ribbon is automatically shifted to a position where any overdraft will always be printed in a distinctive color.

The machine to which the present invention is applied may have a traveling carriage, carrying a tabulating bar upon which stops may be arranged as desired to automatically control the functions of the different totalizers in tabulated positions on the traveling carriage.

This machine may also be equipped with an automatic carriage return mechanism, manual tabulating mechanism and various other features usually found on machines of this type.

DETAIL DESCRIPTION

Operating mechanism

Figures 8, 9:
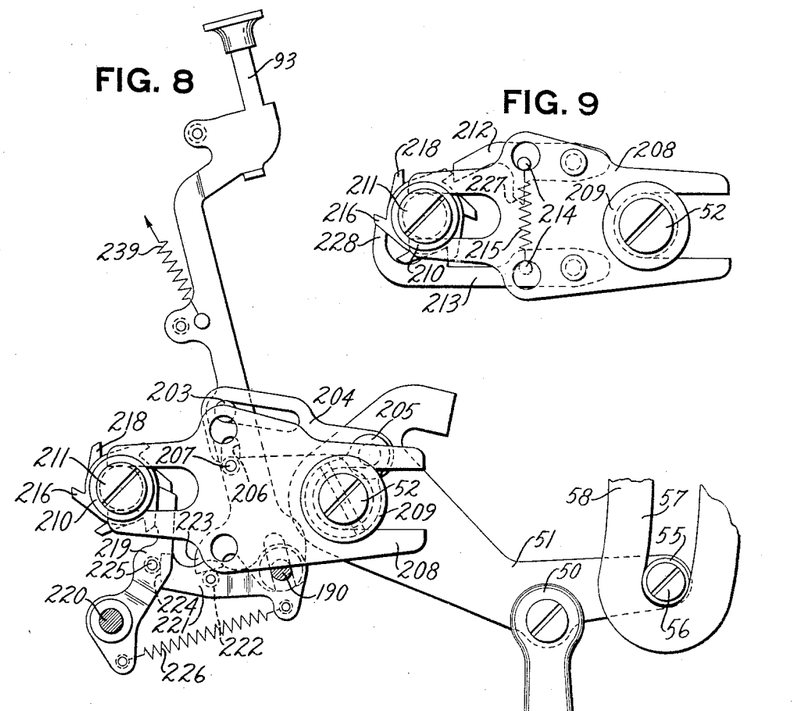
Fig. 8 shows in detail the method of driving the overdraft cam line.
Fig. 9 is a detail of the overdraft cam line driving pitman.

As previously stated, the mechanism of the Ellis machine is driven by an electric motor of the type shown in the above mentioned Perkins Patent No. 1,136,165, which motor runs continuously during the machine operation. This motor is geared to a driving member of a clutch not illustrated. An operating link 50 (Figs. 5 and 8) is pivoted on its lower end to a crank stud secured in a driven member of the clutch mechanism, neither of which is here shown. The upper end of the operating link is pivoted to an operating arm 51 secured to a shaft 52 journaled in main frames 53 and 54 between which the mechanism of the machine is supported. The main frames are secured to a base (not shown) to which is also secured the electric driving motor.

A roller 55 (Fig. 8) mounted on a stud 56 carried by the arm 51 cooperates with a slot 57 in the usual cam plate 58 secured to a shaft 59 (Fig. 2) journaled in the frames 53 and 54. Mounted on the left side of the arm 51 upon the stud 55 is another roller 60 (Fig. 5) adapted to cooperate with a cam race 61 in a cam plate 62 flexibly connected to a liner shaft 63 supported by the frames 53 and 54.

Secured to the shaft 59 (Fig. 2) is a leading frame 64. Pivoted on the shaft 59 is a plurality of reducing arms 65. A plurality of springs 66 are tensioned to hold the reducing arms in contact with the leading frame 64. Secured to each reducing arm 65 is a stud 67 which cooperates with a vertical slot 70 in an actuator rack 71 for a purpose to be later described. An arm 72 of the reducing arm 65 is connected by a link 73 to the printing segment 74. Another arm 75 of the reducing arm 65 has secured therein a stud 76 which cooperates with an extension 77 of an order hook 78 pivoted on a shaft 79. There is one such reducing arm 65, actuator rack 71 and printing segment 74 for each amount bank of keys in the machine. Secured to the liner shaft 63 is a liner 68 adapted to cooperate with teeth cut in the reducing arm 65 for the purpose of holding said reduced arms in proper alignment while an impression is being made by the printing segments.

In adding and non-adding operations, each time the machine operates the actuator racks 71 (Fig. 2) follows the leading frame 64 rearwardly until one of the stops 82 contacts the stud 81 in the depressed amount key 80. This, through the slots 70 in the racks 71 and studs 67 in the reducing arms 65, positions said reducing arms in accordance with the keys depressed. The reducing arms in turn position printing segments 74 commensurate with the values of the keys depressed.

In totalizing operations the actuator racks 71 are positioned by long teeth on the totalizer wheels coming in contact with their respective trip pawls and this likewise positions printing segments in accordance with the amount standing on the totalizer. For a complete description of the above mechanism reference may be had to the previously mentioned Ellis patent 1,176,276.

KEYBOARD

Amount keys

The keyboard of the present machine is similar to that of former Ellis machines and has a plurality of amount keys 80 (Figs. 1 and 2) arranged in rows of which constitute a denominational group or bank, such as units of cents, tens of cents, etc. These keys are "flexible" in that after one key has been depressed in a certain row the depression of another key in that row releases the one previously depressed and so on. Each amount key 80 has secured therein a stud 81 adapted to cooperate with one of the plurality of steps 82 cut in the forward end of the rack 71 to position said rack in accordance with the amount keys depressed as explained above.

Control keys

Figures 1, 2, 3:
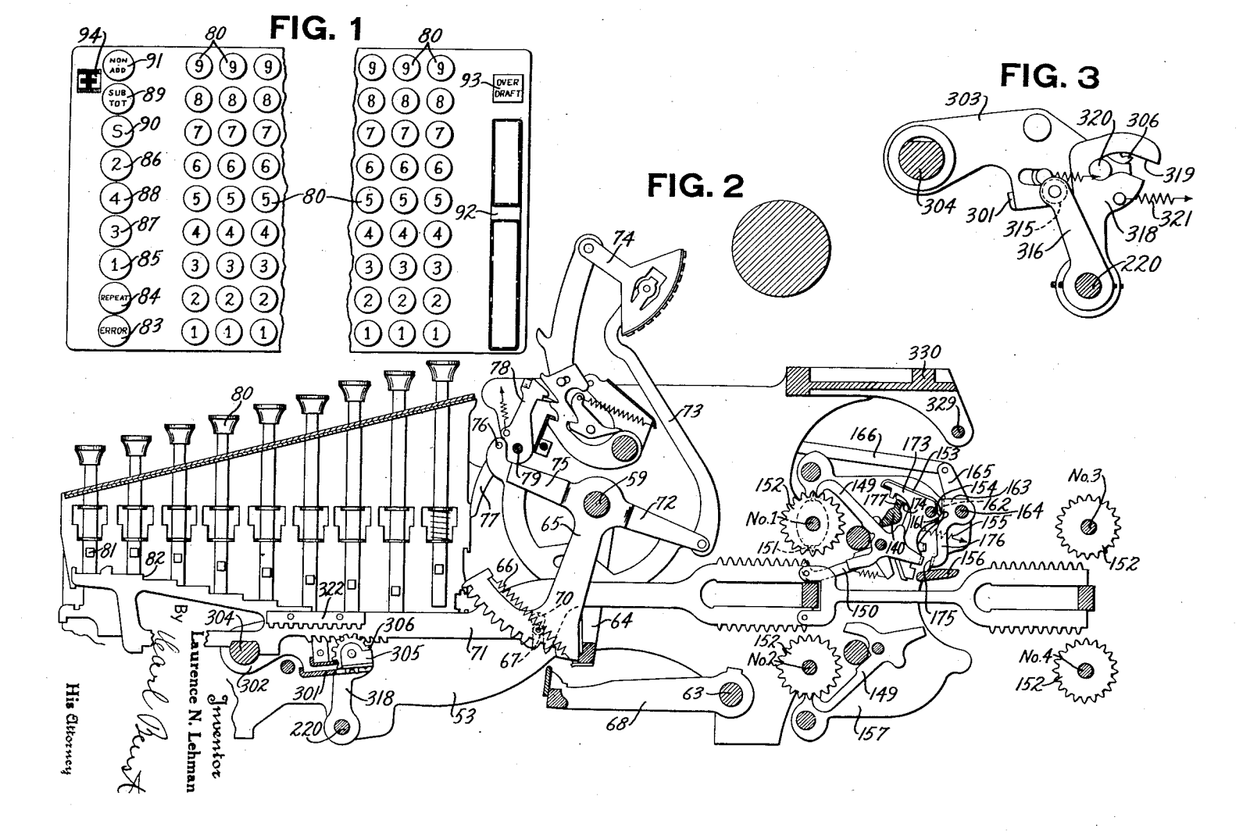
Fig. 1 is a fragmentary plan view showing the layout of the keyboard of a machine embodying the present invention.
Fig. 2 is a section through the machine taken to the right of an amount bank looking toward the left, and shows the location of the auxiliary differential used in connection with overdraft operations.
Fig. 3 is detail of a portion of the auxiliary differential engaging and disengaging mechanism.

Referring to Fig. 1 at the left of the keyboard is a row of keys adapted to control the selection and functions of the different totalizers.

An error key 83 is arranged to release any depressed amount or control key prior to release of the machine for operation, which automatically locks said error key against depression.

A repeat key 84 functions in the usual manner to prevent the automatic release of depressed amount keys in add, non-add and subtract operations.

A series of keys 85, 86, 87 and 88 are total keys for the different totalizers and when used alone control the machine to clear the totalizer they represent. When one of the total keys is used in conjunction with a sub-total key 89, the totalizer is not left in a cleared position after reading as in total operations, but is restored to its original condition.

A subtract key 90 positions the add-subtract totalizer for subtract operations. A non-add key 91 operates in the usual manner to disable all the totalizers when it is desired to print an amount or number without having such amount or number stored in one of the totalizers.

On the right hand side of the keyboard is a starting bar 92 which simultaneously releases the machine for operation and causes the paper wound on the platen to be either line spaced or fed laterally from one column to the next, as the operator desires.

An overdraft key 93 (Figs. 1, 5 and 8) located on the right of the keyboard is used to condition and releases the machine for an overdraft operation. This overdraft key also controls mechanism which in turn controls the ribbon shifting mechanism so that whenever the overdraft key is depressed to print an overdraft such overdraft will be printed in a distinctive color. This overdraft key 93 also causes the machine to automatically go through three cycles of operation. The manner in which this key functions to control the machine for its three cycle operations and also to control the shifting of the ribbon mechanism will be explained later in this specification.

Overdraft indicator

Mounted below the keyboard and visible through an opening therein is an overdraft indicator 94 (Fig. 1) which shows at all times the condition of the add-subtract totalizer. This indicator displays a plus sign when the add-subtract totalizer is not overdrawn and a minus sign when said totalizer is in an overdrawn condition.

Totalizers

The machine in which the present invention is incorporated may have from one to four totalizers. In Fig. 2 as shown four totalizers are arranged in pairs at the rear of the machine and for convenience these different totalizers will be numbered as has heretofore been the custom. The upper front totalizer will be called No. 1, the lower front totalizer No. 2, the upper rear No. 3 and the lower rear No. 4.

The upper front or No. 1 totalizer is arranged for both add and subtract operations, while the other three totalizers are adapted only for adding operations.

As the manner in which the adding and subtracting totalizer and also the adding totalizers function has been fully illustrated and described in the above mentioned Ellis and Ens patents only a very brief description of them will be given herein.

Each of the four totalizers consist of a plurality of totalizer gears or wheels 152 (Fig. 2). Associated with all four totalizers is an adding pawl 149 which functions during transfer operations. Associated with the No. 1 add and subtract totalizer is also a subtract pawl 150 which functions during subtract transfer operations.

The manner of operation and function of these pawls 149 and 150 is clearly described and illustrated in the above mentioned Ens patent, and therefore, it is thought it is unnecessary to go into any detailed description of said mechanism in this case.

During adding operations when any of the four totalizers is selected for addition after the racks 71 have been positioned under control of the keys 80, the totalizer wheels 152 are moved into engagement with the racks 71 by means not shown in this case but fully illustrated and described in the above mentioned Ens and Ellis patents, after which the racks 71 are restored to their normal positions, thus adding into the totalizers which have been engaged therewith the amounts according to the values of the keys depressed.

The No. 1 totalizer may be conditioned for the subtract operations in the usual manner by the depression of the subtract key 90 (Fig. 1) or by arranging the usual subtracting stop on the carriage mechanism which may be used in connection with this machine.

When the subtract key 90 is depressed or when one of the carriage subtraction stops is functioning then the adding pawl 149 (Fig. 2) is moved out of cooperative relation with the totalizer wheels 152 and the subtract pawl 150 is moved into cooperative relation therewith so that the proper subtracting transfers may be accomplished during subtracting operations in the usual manner.

During the totaling operation the four totalizers Nos. 1 to 4 are selected for engagement with the actuating rack by the keys 85, 86, 87, 88 respectively in the usual manner.

Overdraft shaft operating mechanism

Figures 4, 5, 6, 7:
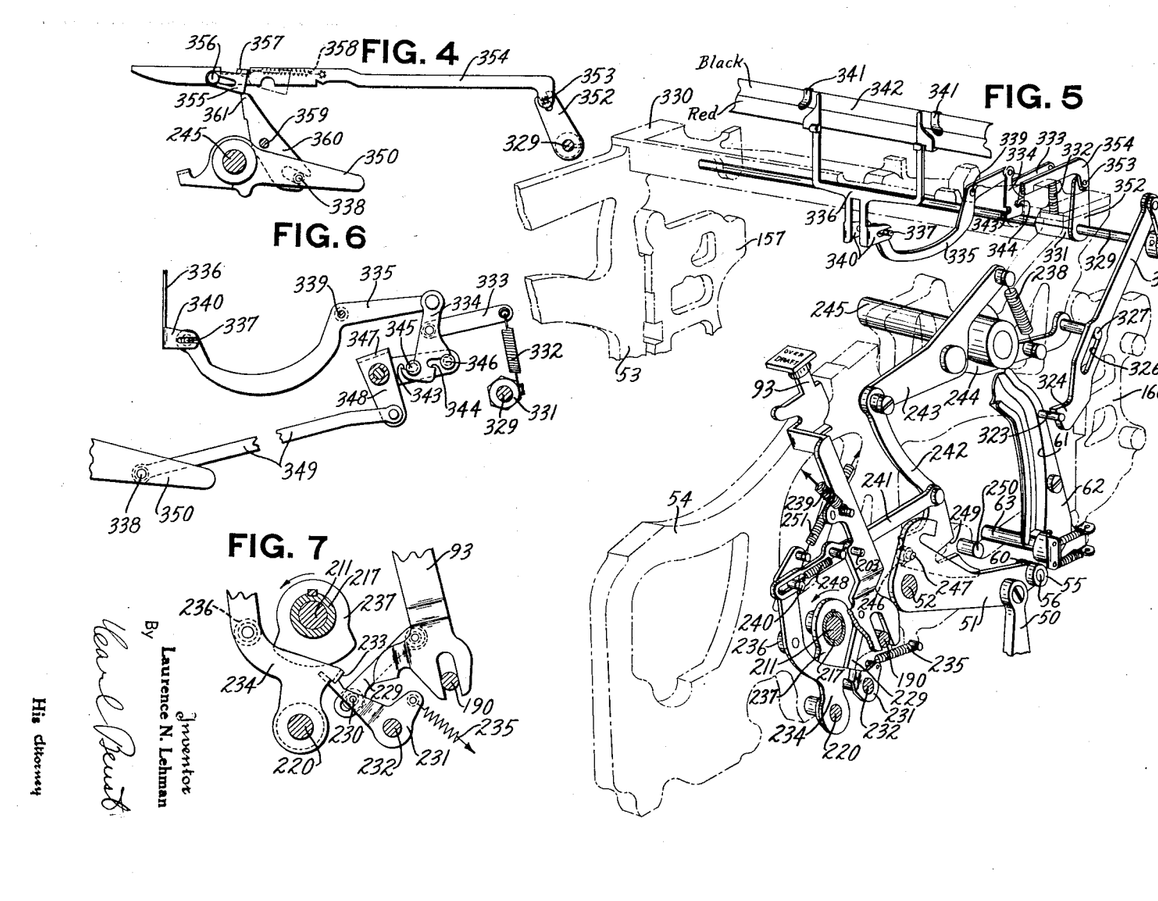
Fig. 4 is a detailed view of the ribbon restoring mechanism.
Fig. 5 is a perspective view showing a portion of the machine operating mechanism, a portion of the overdraft mechanism and the ribbon carrying and shifting or vibrating mechanism.
Fig. 6 is a detail of the ribbon vibrating mechanism.
Fig. 7 is a fragmentary detail view of a portion of the means for disabling the printer under control of the overdraft key.

During subtract operations the totalizer wheels 152 (Fig. 2) of the No. 1 totalizer are rotated counter-clockwise. When an overdraft occurs one of two diametrically opposed projections 151 on the highest order wheel 152 contacts the tooth on the subtracting pawl 150, rocking this pawl counter-clockwise to release an overdraft shaft actuator 153 loosely mounted on a shaft 154. The actuator 153 moves counter-clockwise under the tension of a spring 155 until it contacts a restoring bar 156 pivoted between totalizer frame 157 and 160 (Figs. 2 and 5). Prior to the above movement of the actuator 153 the bar 156 is moved into a position adjacent the lower end of the actuator 153. A projection 161 on the actuator 153 is arranged to contact an ear 162 on an arm 163 secured to an overdraft shaft 164 journaled in the totalizer frames 157 and 160.

Near the end of a machine operation the restoring bar 156 is released and under spring tension rocks to a position to allow any released transfer pawls to function. The overdraft actuator 153 also being under spring tension travels counter-clockwise in unison with the restoring bar 156, whereupon the shoulder 161 moves the overdraft shaft clockwise. Attached on the overdraft shaft 164 is an arm 165 having pivoted thereto one end of a link 166, the forward end of which is pivoted to a latch (not shown) adapted to cooperate with the No. 1 total key 85. Said latch is so formed as to enter a notch (not shown) in the No. 1 total key 85 to lock said key against depression when the overdraft shaft is rotated clockwise by the occurring of an overdraft in the No. 1 totalizer.

If subsequent to an overdraft an amount large enough to overbalance the overdraft is added into the No. 1 totalizer, the upper adding pawl 149 (Fig. 2) of the highest order wheel 152 is engaged and rocked by one of the projections 151 on said wheel. This rocking of the upper adding pawl 149 releases an overdraft restoring lever 173, which under tension of a spring (not shown) contacts an ear 175 bent at right angles on an arm 176 integral with the arm 163 to rock the latter counter-clockwise, thus restoring the overdraft shaft 164 to normal position and unlocking the No. 1 total key 85. The overdraft shaft actuator 153 and restoring lever 173 are restored to their normal positions each time the machine is operated by means of the restoring bar 156. A shift bar 140 has formed thereon a key 177 which, during the adding operation lies beneath a shoulder 174 on the overdraft shaft actuator 153 and prevents any movement of the latter, and at the same time frees the overdraft restoring arm 173, since said key 177 is out of the path of the same. Moving of the shift bar 140 counter-clockwise for subtract operations releases the overdraft shaft actuator 153 and blocks the movement of the overdraft shaft restoring arm 173.

It is felt that further explanation of this mechanism is unnecessary as it has been used in former Ellis machines and a reference may be had to those machines and to the Ellis and Ens patents above referred to. Also a reference may be had to the above mentioned Lee application Serial Number 605,160.

Overdraft mechanism

In the present machine the occurring of an overdraft automatically unlocks the overdraft key 93 which is normally locked against depression. If the operator wishes to ascertain the amount of an overdraft, all that is necessary is the depression of this key 93.

Depression of the overdraft key 93 releases the machine for an overdraft operation consisting of three cycles, and likewise causes the printing mechanism to be disabled during the first two cycles of such operation. It also causes the auxiliary differential to be engaged with and disengaged from the actuator racks 71 at the proper time and conditions the No. 1 totalizer for a total operation during the first cycle of operation, a subtract operation during the second cycle, and finally a second total operation during the third cycle of operation. The first cycle of an overdraft operation causes the total of the No. 1 totalizer, which total is the complement of the overdraft, to be temporarily added into the auxiliary differential. During the second cycle this complement is subtracted from cleared No. 1 totalizer, leaving the positive amount of the overdraft in the No. 1 totalizer and at the same time clearing the auxiliary differential. The final or third cycle of the overdraft operation totalizes and clears the No. 1 totalizer. During this final or third cycle of the overdraft the total which is in a positive form is printed in a distinctive color by reason of the fact that the ribbon shifting or vibrating mechanism is controlled by the depression of the overdraft key 93 in such a manner as to cause the ribbon to be shifted so that portion of the ribbon which is differently colored from the black portion (it may be red or any other desired color, usually red) will be shifted to a position whereby it will cooperate with the type so that the overdraft will be printed in a distinctive color.

Overdraft cam line driving mechanism

A series of cams cooperting with the overdraft mechanism are provided in the present machine. These cams are rotatably mounted as a unit upon the right machine frame 54 and make one complete rotation for each overdraft operation. During normal machine operations the cams remain inoperative, the driving mechanism therefore being effectively coupled thereto only when the overdraft key is depressed. This overdraft cam driving mechanism will now be explained.

A stud 203 (Fig. 8) in the overdraft key 93 extends through a slot in a latch 204 pivoted to an arm 205 fast on the shaft 52. A notch 206 in the latch 204 is arranged to latch over a stud 207 fast in a reciprocable pitman 208 which is bifurcated on its right hand to embrace an undercut portion of a slotted bushing 209 fast on the shaft 52. The left end of the pitman 208 is also bifurcated to embrace a slotted portion of a bushing 210 loosely mounted on a stud 211 carried by the frame 54. Pivotally mounted on the pitman 208 is a pair of pawls 212 and 213 (Fig. 9) each pawl having secured therein a stud 214 which extends through holes in the pitman. These holes are of a correct size to properly limit the travel of the pawls 213 and 212 and form stops against which the studs 214 are held by a spring 215. The pawls 212 and 213 are adapted to cooperate with a three toothed feed ratchet 216 (Figs. 8, 9, 11 and 12) keyed to a hub 217 journaled on the stud 211.

Also keyed to the hub 217 is a six tooth retaining ratchet 218 adapted to cooperate with a retaining pawl 219 (Fig. 8) pivoted on a stud 220 in the frame 54. A locking pawl 221 pivoted on the stud 190 has therein a stud 222 adapted to cooperate with a projection 223 on the overdraft key 93. An arcuate surface 224 on the pawl 221 is arranged to co-act with a stud 225 carried by the retaining pawl 219. A spring 226 stretched between the pawls 219 and 221 holds the pawl 219 in contact with the teeth of the ratchet 218 and also normally holds the pawl 221 in a position where the arcuate surface 224 will be opposite the stud 225, thus locking the pawl 219 between two teeth of the ratchet 218 to prevent any movement of the hub 217 at all times except during overdraft operations.

Depression of the overdraft key 93 (Fig. 8) rocks the pawl 221 counter-clockwise to release the retaining pawl 219 and causes the notch 206 in the latch 204 to engage the stud 207. The arm 51 operates through an approximate angle of 60 degrees each time the machine is operated. During an overdraft operation, inasmuch as the machine makes three operations, the arm 51 will make three oscillations. The first movement counter-clockwise of the arm 51 (Fig. 8) will through the arm 205 and latch 204 slide the pitman 208 to the left, causing the pawl 212 (Fig. 9) to rotate the ratchet 216, hub 217 and cam assembly keyed thereto one-sixth of a rotatation counter-clockwise, or one tooth space on the retaining ratchet 218. The return movement counter-clockwise of the arm 51 returns the pitman 208 to its home position, causing the pawl 213 to engage another tooth of the feed ratchet 216 to rotate the hub 217 another one-sixth of a rotation. The feed pawls 212 and 213 have projections 227 and 228 respectively, which cooperates with the feed ratchet 216 to prevent overthrow during fast operations.

Therefore, during the three cycles of an overdraft operation the cam assembly and hub 217 will make one complete rotation in a counter-clockwise direction.

*Printer disabling mechanism*

Referring to Figs. 5 and 7, pivoted on the overdraft key 93 is a link 229 slotted on its lower end to embrace a stud 230 fast in a detent 231 pivoted on a stud 232 fast in the right machine frame 54. The detent 231 is notched to receive an ear 233 bent on a printer cam arm 234 pivoted on the stud 220. A spring 235 is tensioned to hold the detent 231 in engagement with the cam arm 234.

A roller 236 carried by the arm 234 is adapted to cooperate with a printer cam 237 for a purpose to be later described. A stud 240 fast in the arm 234 extends through a slot in one end of a link 241 pivoted to a printer operating link 242 pivoted to an arm 243 which in turn is pivotally connected to another arm 244 fast on a shaft 245. A spring 238 is tensioned to form a flexible connection between the arms 243 and 244. The lower end of the operating link 242 has a notch 246 arranged to be normally held in engagement with a stud 247, fast in the arm 51, by a spring 248. In the link 242 opposite the notch 246 is another notch 249 adapted to be latched over a stud 250 fast in the right machine frame 54. A spring 251 normally holds the ear 233 in contact with the detent 231.

Depression of the overdraft key 93 (Figs. 5 and 7) through the link 229 rocks the detent 231 counter-clockwise and releases the cam arm 234 which under tension of the spring 251 moves clockwise until the roller 236 contacts the periphery of the cam 237. This movement of the arm 234 through the link 241 rocks the operating link 242 counterwise, disengaging the notch 246 from the stud 247 and engaging the notch 249 with the stud 250. This prevents the printer shaft 245 from receiving movement from the operating arm 51 and locks said shaft 245 in its home position during all of the first and second cycles of an overdraft operation.

At the end of the second cycle of an overdraft operation the cam 237 engages the roller 236 and rocks the arm 234 counter-clockwise, re-engaging the notch 246 with the stud 247 so that the printer shaft 245 will receive its proper movement on the third or last cycle of an overdraft operation to print the overdraft.

When the overdraft key is released near the end of an overdraft operation, it is forced upwardly by a spring 239, causing the detent 231 to re-engage the ear 233 on the arm 234 to retain operative connection between the arm 51 and the printer shaft 245 after the high point of the cam 237 passes beyond the roller 236 to its home position, as shown in Fig. 7.

*Auxiliary differential*

As previously stated this machine is provided with an auxiliary differential mechanism into which the complement of an overdraft is temporarily stored during part of an overdraft operation.

It is not thought necessary in the present case to go into a full detailed description of this auxiliary mechanism and it will be only very briefly described. If a further detailed description thereof is desirable, reference may be had to the above mentioned Lee application, Serial Number 605,160.

The auxiliary differential consist of a series of pinions 306, one for each of the actuator racks 71, located directly beneath said racks. One of these pinions and a portion of the carrying frame and engaging mechanism therefor is shown in Fig. 2.

Referring now particularly to Figs. 2 and 3, the auxiliary differential frame work consists of a pair of arms 302 and 303 pivoted on a rod 304 supported by the main frames 53 and 54. These arms 302 and 303 are connected by an angle bar 301 having attached thereto a plurality of brackets 305 (only one of which is shown), each bracket having pivoted thereto one of the wheels or pinions 306 adapted to cooperate with a rack 322 carried by the actuator rack 71.

Keyed to the hub 217 (Figs. 11 and 12) is an engaging cam 314, the periphery of which is adapted to co-act with a roller 315 (Fig. 3) carried by an arm 316 secured to the shaft 220. Also secured to the shaft 220 is the pair of arms 318 (only one of which is shown) each having a cam slot 319 adapted to cooperate with a stud 320, one of which is secured to each of the arms 302 and 303. Springs 321 are tensioned to hold the roller 315 in contact with the cam 314.

As previously explained, in the first cycle of an overdraft operation, a total (complement of the overdraft) is taken from the No. 1 totalizer at the beginning of which operation the totalizer wheels 152 are meshed with the actuator racks 71. The initial movement rearwardly of the actuator racks rotates said wheels 152 until stopped by one of the long teeth 151 thereon coming in contact with the trip pawl 149. When this occurs the actuator racks 71 and printing segments 74 are positioned commensurate with the amounts standing on the totalizer wheels which, in the case of an overdraft is the complement thereof. While the actuator racks 71 are thus positioned, the cam 314 (Fig. 11) rocks the arm 316 (Fig. 3), shaft 220 and arms 318 counter-clockwise. The cam slots 319 co-acting with the studs 320 rocks the auxiliary differential frame counter-clockwise to mesh the pinions 306 with the racks 322 which, as previously stated are secured to the actuator racks 71. During the last half of the first cycle of an overdraft operation the actuator racks 71 are returned to their forward positions thus rotating the pinions 306 counter-clockwise to positions corresponding to the amounts taken from the racks 71.

In the second cycle of an overdraft operation the complement of the overdraft which has been temporarily stored in the auxiliary differential is subtracted from the No. 1 totalizer, which was reset to zero in the preceding total operation, thus leaving the positive amount of the overdraft in said No. 1 totalizer.

Before the actuator racks 71 start their movement forwardly in the last half of the second cycle of an overdraft operation, the pinions 306 of the auxiliary differential are disengaged from the racks 322 by the cam 314 and spring 321 returning the arms 318 to their normal positions. The auxiliary differential then remains in this position throughout the remainder of an overdraft operation.

From the foregoing it can be clearly seen that when a total is taken from the No. 1 totalizer in the third cycle of an overdraft operation, the amount of the overdraft will be printed in positive form, which is the desired result.

Ribbon shifting mechanism

It is essential that an overdraft be printed in a distinctive color so that it will stand out from other printing upon the same statement or record sheet. To accomplish this, mechanism has been designed for shifting the ink ribbon which is effective only during an overdraft operation. Said mechanism will now be explained.

Referring particularly to Fig. 5, fast in the cam plate 62 is a stud 323 adapted to cooperate with a projection 324 on a leg of a pitman 325 having a slot 326 which embraces a stud 327 fast in the arm 244. The right end of the pitman 325 is pivoted to an arm 328 secured to a ribbon shifting shaft 329 rotatably mounted in a top frame 330.

Secured to the shaft 329 (Figs. 5 and 6) by means of a set screw is a settable hub 331 having rigidly secured thereto one end of a spring arm 332 whose upper end is attached to a link 333 pivoted to a shifting lever 334, which in turn is pivoted to a rocker 335. The spring arm 332 is a closely wound member and is in relaxed condition, and is used as an arm to provide a flexible drive between 331 and 333. The rocker 335 is pivoted to the top frame 330 and is operatively connected to a ribbon shifting fork 336 by a stud 337 fast on said rocker 335 and extending through horizontal slots cut in a pair of ears 340 bent on the fork 336. The fork 336 is mounted to slide vertically in a printer comb plate (not shown). The upper ends of the fork 336 are bent in such a manner as to form guides 341 for a multi-colored inking ribbon 342, the upper half of which contains black ink and the lower half red. The lever 334 has notches 343 and 344 adapted to cooperate respectively with studs 345 and 346 (Fig. 6) secured in an arm of a yoke 347 pivoted to the top frame 330. Another arm 348 of the yoke 347 is operatively connected by a link 349 to a stud 338 in an arm 350 fast on the printer shaft 245 so that each time the printer shaft 245 receives movement the yoke 347 is rocked thereby, its first movement being clockwise.

The mechanism last explained constitutes what is called the ribbon vibrating mechanism and upon each operation of the machine lifts the ribbon into the path of the printing type segments 74, the ribbon normally being below the line so that the printing will be visible. Normally the notch 343 (Fig. 6) in the arm 334 engages the stud 345 in the yoke 347 so that upon operation of the machine the arm 350 rocks the yoke 347 to raise the fork 336 to a position where the black portion of the ink ribbon 342 will be in line with the printing segments 74.

As previously explained, the roll 60 (Fig. 5) on the arm 51 oscillates the cam plate 62 each time the machine is operated. Likewise under normal conditions the arm 244 is oscillated each time the machine operates and receives its clockwise movement prior to the movement of the cam plate 62. The clockwise movement at such time, of the arm 244 through the pin 327 and slot 326 rocks the pitman 325 so that the projection 324 thereon is moved out of the path of the pin 323 whereby the latter will clear the projection 324 thus imparting no movement to the pitman 325 upon the first clockwise movement of the cam plate 62.

However, as explained above, the printer shaft 245 is disabled for the first two cycles of an overdraft operation. This allows the projection 324 to remain in the path of the stud 323 carried by the plate 62 whose clockwise movement during the first cycle of an overdraft operation moves the pitman 325 toward the rear and rocks the arm 328, shaft 329 and spring arm 332 (Fig. 6) clockwise to shift the lever 334 whereby it will be disengaged from the stud 345 and its notch 344 will engage the stud 346. With the lever 334 in the position last described it increases the leverage of the yoke 347 on said lever and when the printer shaft 245 is rocked clockwise during the third cycle of the overdraft operation, and the arm 350 receives such movement, the link 349 rocks the yoke 347 and lowers the lever 334 a greater distance than usual which through the rocking of the rocker 335 results in the lifting of the fork 336 to a position where the lower half or red portion of the ribbon 342 is in the path of the printing segments 74, thus causing the overdraft to be printed in a distinctive color.

Ribbon restoring mechanism

The shaft 329 (Figs. 4, 5 and 6) is restored to normal position in the third cycle and near the end of an overdraft operation in the following manner. Secured to the shaft 329 is an arm 352 bifurcated to embrace a stud 353 fast in a pitman 354 slidably mounted in the machine top frame 330. A latch 355 has a slot and is slidably and pivotally connected to the pitman 354 by a stud 356 which is secured to the pitman and passes through said slot. An ear 357 fast on the latch 355 is normally held against the bottom of a notch in the pitman 354 by a spring 358. Pivoted on a stud 359 fast in the printer guide plate (not shown) is a lever 360 having a nose 361 adapted to cooperate with the latch 355. The lower end of the lever 360 is bifurcated to embrace the stud 338 in the arm 350.

When the shaft 329 is rocked clockwise during the first cycle of an overdraft operation in the manner explained above, the pitman 354 is moved to the right (Fig. 4) and the latch assumes the dot and dash line position.

As previously explained, on the last or third cycle of an overdraft operation the printer cam shaft 245 (Fig. 5) is operatively connected to the arm 51 whereupon the arm 350 moves clockwise and rocks the lever 360 clockwise causing the nose 361 to wipe past the latch 355 while the latter is in its moved position (indicated by the dot and dash lines, Fig. 4), and force that latch upwardly against the tension of the spring 358. Upon the return or counter-clockwise movement of the arm 350 and lever 360, the nose 361 contacts the latch 355 and restores the same and the pitman 354 to normal position which rocks the shaft 329 counter-clockwise, thus restoring the ribbon vibrating mechanism to its normal position, in which position the black portion of the ribbon 342 will be contacted by the printing segments 74.

Machine release during overdraft operation

Figures 10, 11, 12:
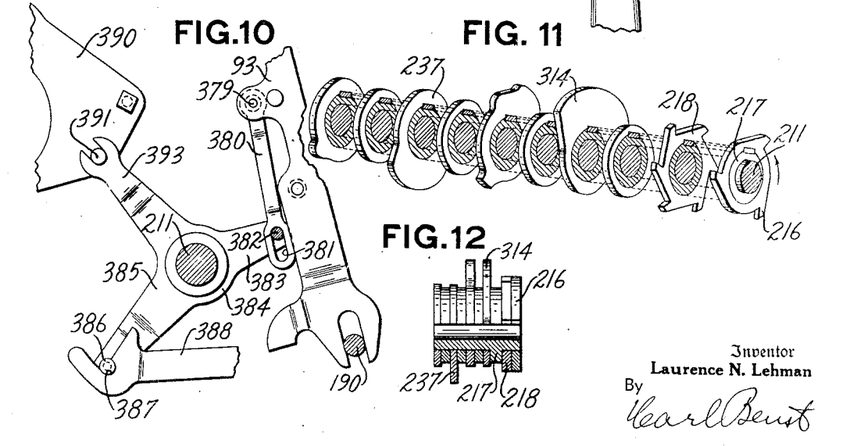
Fig. 10 is a view in detail showing how the machine release mechanism is operated from the overdraft key.
Fig. 11 is a disunited perspective view of the overdraft cam line.
Fig. 12 is a sectional view of the overdraft cam line.

In overdraft operations the depression of the overdraft key 93 releases the machine for operation and the mechanism for accomplishing this result will now be explained, referring particularly to Fig. 10.

Pivoted at 379 to the overdraft key 93 is a link 380 having a slot 381 which embraces a stud 382 fast in an arm 383 of a lever 384 pivoted on the stud 211. Another arm 385 of the lever 384 carries a stud 386 adapted to cooperate with a notch 387 in a clutch release arm 388 of the usual type pivoted to the motor frame (not shown).

Depression of the overdraft key 93 through the link 380 rocks the lever 384 clockwise forcing the stud 386 out of the notch 387 in the arm 388. The arm 388 upon being thus released is rocked counter-clockwise by means of a spring (not shown) to release the machine for operation. As long as the overdraft key 93 is not released at the end of the first cycle, the arm 388 remains disconnected from the arm 385 and the machine will make a second cycle. The same is true at the end of the second cycle and consequently the machine goes through a third cycle at the end of which the overdraft key is released whereupon the machine stops. An arm 393 connected to the arms 383 and 385 embraces a stud 391 in the regular releasing plate 390 to which is connected the regular operating or release bar 92 (Fig. 1) whereby the machine may be released as is usual in Ellis machines for add, non-add and subtract operations as is clearly illustrated and described in the Ellis patents mentioned in the outset of this specification. The lever 384 being under spring tension causes the stud 386 to re-engage the notch 387 to retain the levers 384 and 390 in their restored positions in operations other than overdraft operations when the machine is released by the starting bar 92 as above stated and during such operations the stud 382 moves idly in the slot 381 without disturbing the overdraft key 93.

Summary

It is not thought necessary to give any extensive detailed operation of the machine as such has been done while describing the various sections thereof. However, summarizing the foregoing description it will be seen that in the present machine the depression of the overdraft key causes the complement of an overdraft to be transposed to and printed as a positive number. At the same time the depression of the overdraft key causes the ribbon mechanism to function in such a way that all overdrafts are automatically printed in a distinctive color. In other words, the operator does not have to pay any attention to the ribbon mechanism as in former machines wherein it was necessary when taking an overdraft, to always be sure that the ribbon was manually shifted before starting an overdraft operation.

While the forms of mechanism herein shown and described are admirably adapted to fulfill the objects primarily stated it is to be understood that it is not intended to confine the invention to the form of embodiment herein disclosed for it is susceptible of embodiment in various forms all coming within the scope of the claims which follow.

1. In an accounting machine, the combination of an accumulator and means for taking a negative total following an overdraft therein; printing means; means for disabling the printing means during part of such total taking operation; a shiftable bichrome inking means associated with the printing means; and means controlled by the disabling of the printing means for automatically shifting said bichrome inking means to print a negative total in a distinctive color when the printing means is subsequently enabled.

2. In a machine of the class described, the combination of an add-subtract totalizer and means for taking a negative total following an overdraft therein; printing means; a shiftable two color inking device associated with the printing means; a control member manipulation of which releases the machine to operate through three cycles to transpose a complement of the negative total into a true negative total means released by the control member to disable the printing means during the first and second cycles of operation, and means controlled by the last named means to automatically shift the inking device to print the true negative total in a distinctive color when the printing means is subsequently enabled.

3. In a calculating machine, the combination of an add-subtract totalizer; printing means; a shiftable two colored inking device for the printing means, means to cause the machine to operate through a given number of cycles to print a true negative total; said means operating to disable the printing means during the initial cycle of an overdraft operation; and means controlled by the printing means when disabled for shifting the inking device to a position where an overdraft will be printed in a different color from a regular printing when said printing means is enabled.

4. In a calculating machine, the combination of an accumulator; printing means; a shiftable two colored inking device associated with the printing means; an overdraft control member; means rendered effective by operation of the overdraft control member for causing the machine to automatically operate through three successive cycles to print a true negative total, said means operating to disable the printing means during the first two cycles of an overdraft operation; and means effective only when the printing mechanism is disabled for shifting the inking device to a position where the true negative total will be printed in a distinctive manner, when said printing device is subsequently enabled.

5. In a machine of the class described, the combination of an add-subtract accumulator; printing means; a shiftable multi-colored inking device for the printing means; an overdraft control member; means controlled by the overdraft control member for causing the machine to operate through a plurality of cycles to print a true negative total, said means operating to disable the printing means during all but the last cycle of an overdraft operation; means controlled by the printing means for shifting the multi-colored inking device to a position where a true negative total will be printed in a distinctive color; and means operated by the printing means for restoring the inking means to normal position near the end of each operation of the printing means.

6. In a machine of the class described, the combination of an add-subtract totalizer; printing means; operating means for the printing means; a two colored inking device for the printing means; ribbon shifting means; a ribbon shifting control member intermediate the operating means and the ribbon shifting means; a regularly excursioned operating member; a projection on said operating member adapted to cooperate with the shifting control member; means whereby the operating means for the printing means during normal machine operations rocks the shifting control member out of the path of the projection on the operating member; and means for disabling the operating means for the printing means during part of a negative total operation thereby causing the shifting control member to remain in the path of the projection on the operating member to shift the inking device to a position where a negative total will be printed in a distinguishing color when the printing operating means is subsequently enabled.

7. In a machine of the class described, the combination of an add-subtract totalizer; printing means; a shiftable bichrome inking device; an overdraft control member; a printer operating shaft controlled by said overdraft member; a member on said operating shaft; an oscillating member; and means operable by the latter member under control of the member on the printer operating shaft for shifting the inking device so as to print in a particular color during an operation of the machine as controlled by said overdraft control member.

8. In a machine of the class described, the combination of an add-subtract totalizer; printing means; a shiftable bichrome inking device; an overdraft control member; a printer operating shaft controlled by said overdraft control member; a member on said operating shaft; an oscillating member; and means connected to said inking device and controlled by the member on the operating shaft so as to be operated by said oscillating member during an operation of the machine as controlled by said overdraft control member to print a negative total in a particular color.

9. In a machine capable of printing a true negative total, the combination of an overdraft control member adapted when operated to release the machine for a plural cycle operation; a printer operating shaft; a member on said operating shaft; a projection on said member; an oscillating member; a projection thereon; a shiftable bichrome inking device; means connected to the inking device and engaging the first of said projections and adapted to be engaged by the other of said projections, the former projection adapted to move the last means out of the path of the latter projection; and means operable upon operation of the overdraft control member for preventing movement of the first mentioned projection whereby the second mentioned projection upon movement of said oscillating member operates the means connected to the inking device to shift said device to print a negative total in a particular color.

10. In a machine capable of printing regular amounts and a true negative total, the combination of an overdraft control member adapted when operated to release the machine for a plural cycle operation; a manipulative device adapted to release the machine for a single cycle operation; a printer operating shaft; a member on the operating shaft; a projection on said member; an oscillating member; a projection theron; a shiftable two color inking device; means connected to the inking device and engaging the first of said projections and adapted to be engaged by the other of said projections, the former projection adapted to move the last means out of the path of the latter projection when the machine is released by said manipulative device whereby the regular amounts will be printed from one portion of the two color inking device; and means operable upon operation of the overdraft control member for preventing movement of the first mentioned projection whereby the second mentioned projection upon movement of said oscillating member operates the means connected to the inking device to shift said device to print a negative total from another portion of the two color inking device.

11. In a machine of the class described, the combination of an add-subtract totalizer; a printing device; a shiftable two color inking device; an overdraft control member adapted to release the machine for operation; a manipulative device adapted to release the machine for operation; a printer operating shaft; a member on the operating shaft; an oscillating member; means connected to said inking device and engaging the member on the operating shaft and adapted to be engaged by said oscillating member, the member on the operating shaft adapted to move said means out of the path of the oscillating member upon release of the machine by said manipulative device whereby the amount printed will be in one certain color; and means operable upon operation of the overdraft control member for preventing movement of the member on the operating shaft whereby said oscillating member operates said first mentioned means to shift the two color inking device to print a true negative total in a different color.

12. In an accounting machine, the combination of an add-subtract accumulator; a printing device; an overdraft control member adapted to release the machine for operation; a manipulative device adapted to release the machine for operation; a shiftable two colored inking device associated with the printing device; means operable upon release of the machine by said manipulative device for controlling the two colored inking device so that a certain portion of the same will cooperate with the printing device to print the characters in a certain color; means controlled by the overdraft control member for disabling the printing device during a part of a negative total printing operation when the machine is released for operation by the overdraft control member; and means for controlling the first mentioned means during an operation of the machine when the same is released by the overdraft control member for automatically shifting the inking device so as to bring another portion thereof in cooperative relation with the printing device whereby a negative total will be printed in a different color when said printing device is subsequently enabled.

LAURENCE N. LEHMAN.